United States Patent
Kim et al.

(10) Patent No.: US 8,705,077 B2
(45) Date of Patent: Apr. 22, 2014

(54) PRINTING SYSTEM AND PRINTING METHOD

(75) Inventors: Kyeong-man Kim, Suwon-si (KR); Hyun-soo Oh, Suwon-si (KR); Mi-jung Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1487 days.

(21) Appl. No.: 11/507,036

(22) Filed: Aug. 21, 2006

(65) Prior Publication Data

US 2007/0064254 A1    Mar. 22, 2007

(30) Foreign Application Priority Data

Aug. 19, 2005  (KR) .................. 10-2005-0076426

(51) Int. Cl.
*G06F 3/12* (2006.01)

(52) U.S. Cl.
USPC ........................... 358/1.15; 358/1.13; 358/1.2

(58) Field of Classification Search
USPC ............... 358/1.13, 1.14, 1.9, 3.03, 1.2, 1.15; 347/104; 382/167
See application file for complete search history.

(56) References Cited

U.S. PATENT DOCUMENTS

| | | | | |
|---|---|---|---|---|
| 5,664,070 A | * | 9/1997 | Egawa et al. | 358/1.2 |
| 5,704,021 A | * | 12/1997 | Smith et al. | 358/1.9 |
| 6,081,254 A | * | 6/2000 | Tanaka et al. | 382/167 |
| 6,144,458 A | * | 11/2000 | McLachlan et al. | 358/1.15 |
| 6,369,909 B1 | * | 4/2002 | Shima | 358/1.15 |
| 6,453,129 B1 | * | 9/2002 | Simpson et al. | 399/23 |
| 6,658,089 B1 | * | 12/2003 | Mohr et al. | 378/162 |
| 6,693,718 B1 | | 2/2004 | Takaoka | |
| 6,738,153 B1 | * | 5/2004 | Aschenbrenner et al. | 358/1.14 |
| 6,757,071 B1 | * | 6/2004 | Goodman et al. | 358/1.13 |
| 6,977,755 B2 | * | 12/2005 | Payne et al. | 358/1.9 |
| 7,163,286 B2 | * | 1/2007 | Shiraiwa et al. | 347/104 |
| 7,436,550 B2 | * | 10/2008 | Aoki et al. | 358/3.03 |
| 7,649,650 B2 | * | 1/2010 | Eschbach | 358/1.9 |
| 2003/0053082 A1 | * | 3/2003 | Tomito et al. | 358/1.2 |
| 2003/0218766 A1 | * | 11/2003 | Matsumoto | 358/1.13 |
| 2004/0008364 A1 | * | 1/2004 | Ohara | 358/1.14 |
| 2004/0156075 A1 | * | 8/2004 | Hohensee et al. | 358/1.15 |
| 2005/0262437 A1 | * | 11/2005 | Patterson et al. | 715/517 |
| 2007/0008559 A1 | * | 1/2007 | Rich et al. | 358/1.9 |

FOREIGN PATENT DOCUMENTS

EP    1 292 121    12/2003

* cited by examiner

*Primary Examiner* — Ashish K Thomas
(74) *Attorney, Agent, or Firm* — Roylance, Abrams, Berdo & Goodman LLP (57) ABSTRACT

A printing method and a printing system are provided where a printing property of the printing system is stored, a printing compatibility of a printing data of an object to be printed is determined by comparing a data property of the printing data with the stored printing property of the printing system, and the determined printing compatibility is displayed to a user. Accordingly, a printing system and a printing method, which are capable of preventing user inconvenience and waste of resources due to re-printing are provided.

40 Claims, 5 Drawing Sheets

PRINTING SYSTEM AND PRINTING METHOD

CROSS-REFERENCE TO RELATED APPLICATIONS

This application claims the benefit under 35 U.S.C. §119(a) of Korean Patent Application No. 2005-0076426, filed on Aug. 19, 2005, in the Korean Intellectual Property Office, the entire disclosure of which is hereby incorporated by reference.

BACKGROUND OF INVENTION

1. Field of Invention

The present invention relates to a printing system and a printing method. More particularly, the present invention relates to a printing system and a printing method capable of preventing inconvenience to a user and preventing resources from being wasted as a result of re-printing.

2. Description of the Related Art

A printing system generally forms an image by injecting or fixing ink, toner and the like upon a recording medium such as a paper sheet based on printing data representing the image such as a photograph, a graphic, and a text among others. The printing system can be implemented by a digital publishing system. The digital publishing system provides a user with an editing means for editing an object to be printed such as a photograph, a graphic, a text with a type of digital data. The digital publishing system then prints the image edited by the user. A schematic structure of such a conventional printing system that is capable of being edited by the user is illustrated in FIG. 1.

Figure 1:
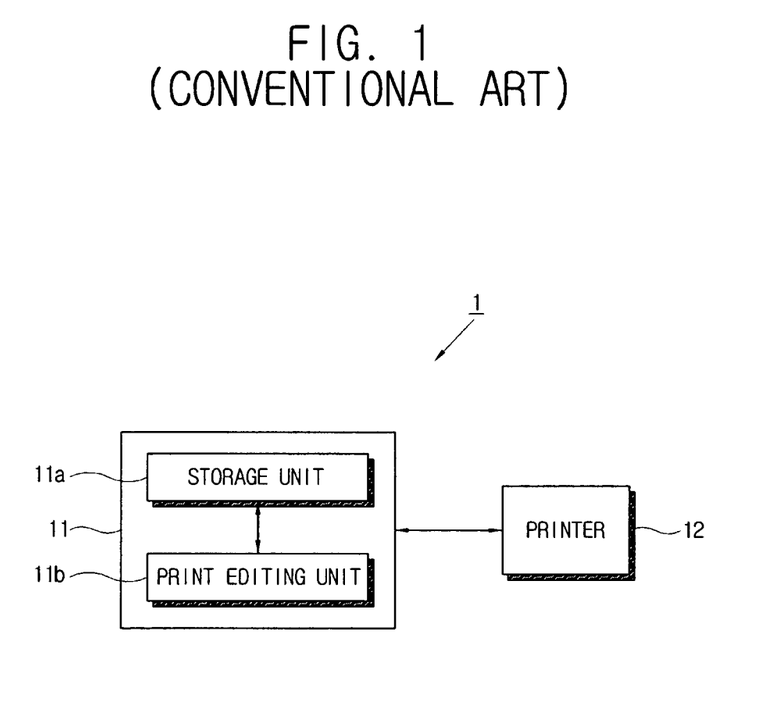
FIG. 1 is a schematic block diagram illustrating a conventional printing system capable of being edited by user.

The printing system 1 shown in FIG. 1 is equipped with a print analyzing apparatus 11 and a printer 12. The print analyzing apparatus 11 includes a storage unit 11a in which the printing data of an original image to be printed, such as a photograph, a graphic, and a text among others are stored in prescribed form. A print editing unit 11b facilitates the editing of the printing data by the user. The printing data selected by the user is transmitted from the print analyzing apparatus 11 to the printer 12 where image processing is carried out to perform the printing operation on the recording medium such as a paper sheet.

Figure 2:
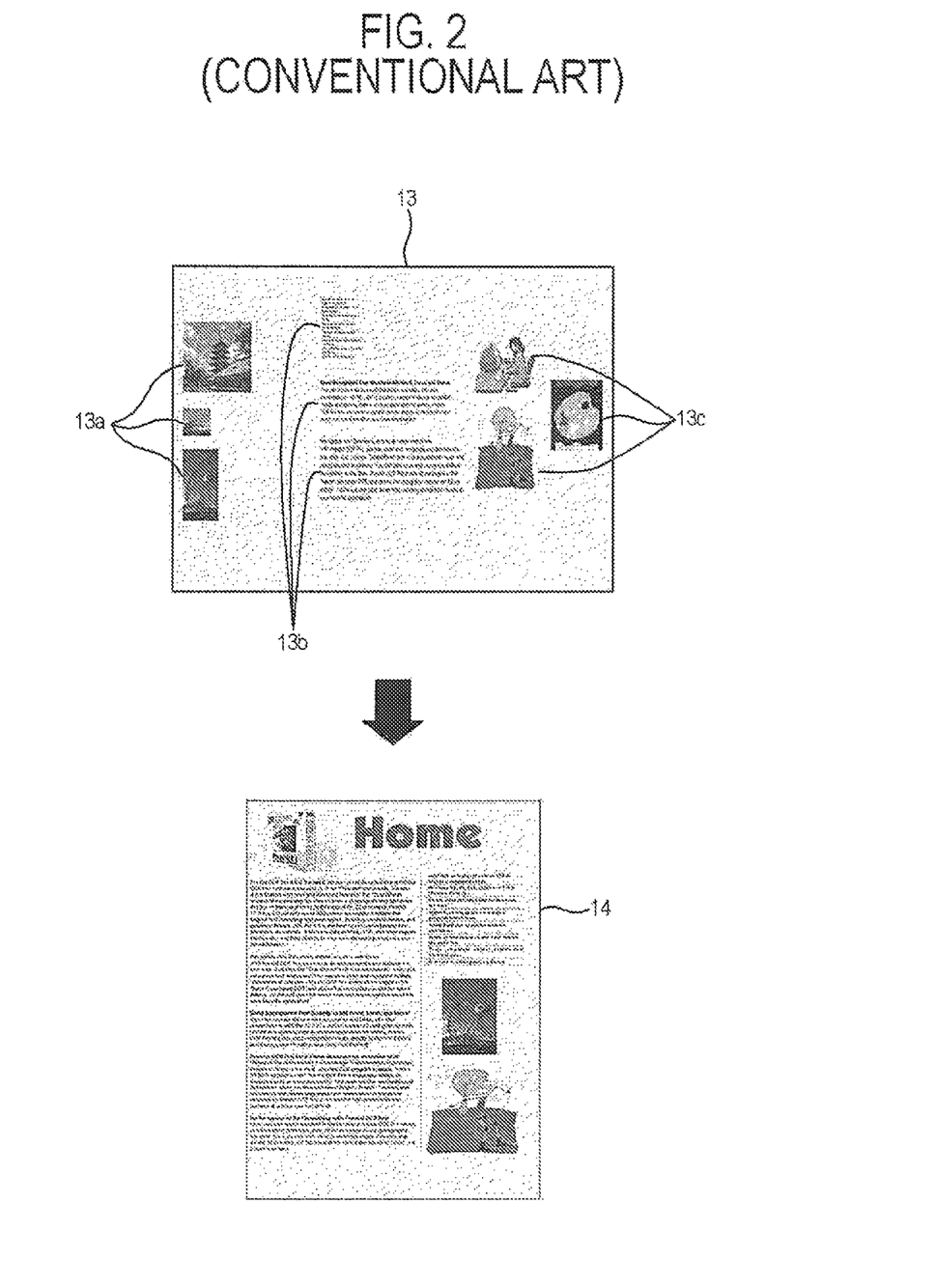
FIG. 2 is a diagram illustrating an example of an image printed by the printing system of FIG. 1.

FIG. 2 is a diagram illustrating an example of an image printed by the printing system 1 in FIG. 1. The printing editing unit 11b of the printing system 1 causes a given display unit to display an image 13 corresponding to the printing data stored in the storage unit 11a. The image 13 includes a photograph 13a, a text 13b, and a picture or a graphic 13c. The printing editing unit 11b establishes a layout 14 based on the image 13 selectively edited by the user among the photograph 13a, the text 13b and the picture, or the graphic 13c. The printer 12 performs the printing operation based on the layout 14.

The conventional printing system 1 displays the layout 14 of the image edited by the user and cannot provide information which is capable of estimating the printing results. Once the user determines that the layout 14 is appropriate, the user gives instructions to print the image. The user may still have to correct the layout and perform printing operations again if an unexpected problem with the printing quality such as poor resolution occurs in the printing results. This results in a waste of ink, toner, and paper.

Accordingly, there is a need for an improved system and method capable of preventing an inconvenience to a user and limiting the amount of resources wasted.

SUMMARY OF THE INVENTION

An aspect of exemplary embodiments of the present invention is to address at least the above problems and/or disadvantages and to provide at least the advantages described below. Accordingly, it is an aspect of an exemplary embodiment of the present invention to provide a printing system and a printing method capable of preventing inconvenience to a user and preventing resources from being wasted as a result of re-printing.

The foregoing and/or other aspects of exemplary embodiments of the present invention can be achieved by providing a printing method of a printing system where a printing property of the printing system is stored, printing compatibility of a printing data of an object to be printed is determined by comparing a data property of the printing data with the stored printing property of the printing system, and the determined printing compatibility is displayed to facilitate viewing by a user.

According to an aspect of an exemplary embodiment of the present invention, the printing method further comprises storage of the printing property suitable for the data property of the printing data and display of the suitable printing property to enable the user to view it if the printing data of the object to be printed is not suitable.

According to an aspect of an exemplary embodiment of the present invention, the printing method further comprises display of a printing image estimated from the printing data based on the suitable printing property to enable the user to view it.

According to an aspect of an exemplary embodiment of the present invention, the printing method further comprises storage of a quality information on the printing image estimated from the printing data corresponding to the data property and the printing property of the printing data and display of the quality information on the printing image estimated corresponding to the printing data of the object to be printed to enable the user to view it.

According to an aspect of an exemplary embodiment of the present invention, the printing method further comprises storage of an application program information corresponding to the data property and the printing property of the printing data and display of the stored application program information corresponding to the printing data of the object to be printed to enable the user to view it.

The foregoing and/or another aspect of an exemplary embodiment of the present invention can be achieved by providing a printing system comprising a display unit, an information storage unit, a compatibility determining unit, and a control unit. The information storage unit stores a printing property of the printing system. The compatibility determining unit determines a printing compatibility of the printing data by comparing a data property of the printing data with the stored printing property of the printing system. The control unit controls the display unit to display the determined printing compatibility to enable a user to view it.

According to an aspect of an exemplary embodiment of the present invention, the information storage unit further stores the printing property suitable for the data property of the printing data, and the control unit controls the display unit to display the suitable printing property to enable the user to view it if the printing data of the object to be printed is not suitable.

According to an aspect of an exemplary embodiment of the present invention, the control unit controls the display unit to display the printing image estimated from the printing data based on the suitable printing property.

According to an aspect of an exemplary embodiment of the present invention, the information storage unit further stores quality information on the printing image estimated from the printing data corresponding to the data property and the printing property of the printing data. The control unit controls the display unit to display the quality information on the estimated printing image corresponding to the printing data of the object to be printed.

According to an aspect of an exemplary embodiment of the present invention, the information storage unit also stores an application program for information corresponding to the data property and the printing property of the printing data. The control unit controls the display unit to display the stored application program information corresponding to the printing data of the object to be printed to enable the user to view it.

According to an aspect of an exemplary embodiment of the present invention, the data property of the printing data comprises at least one of a type of the printing data, an amount of the printing data, whether the printing data is generated via scanning, and a resolution, a size, a color, and a font of the image corresponding to the printing data.

According to an aspect of an exemplary embodiment of the present invention, the printing property of the printing system comprises at least one of a printing type, a printing speed, a resolution, a color, a type of half toning, and printer driver information.

BRIEF DESCRIPTION OF THE DRAWINGS

The above and other exemplary objects, features, and advantages of certain exemplary embodiments of the prevent invention will be more apparent from the following description taken in conjunction with the accompany drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
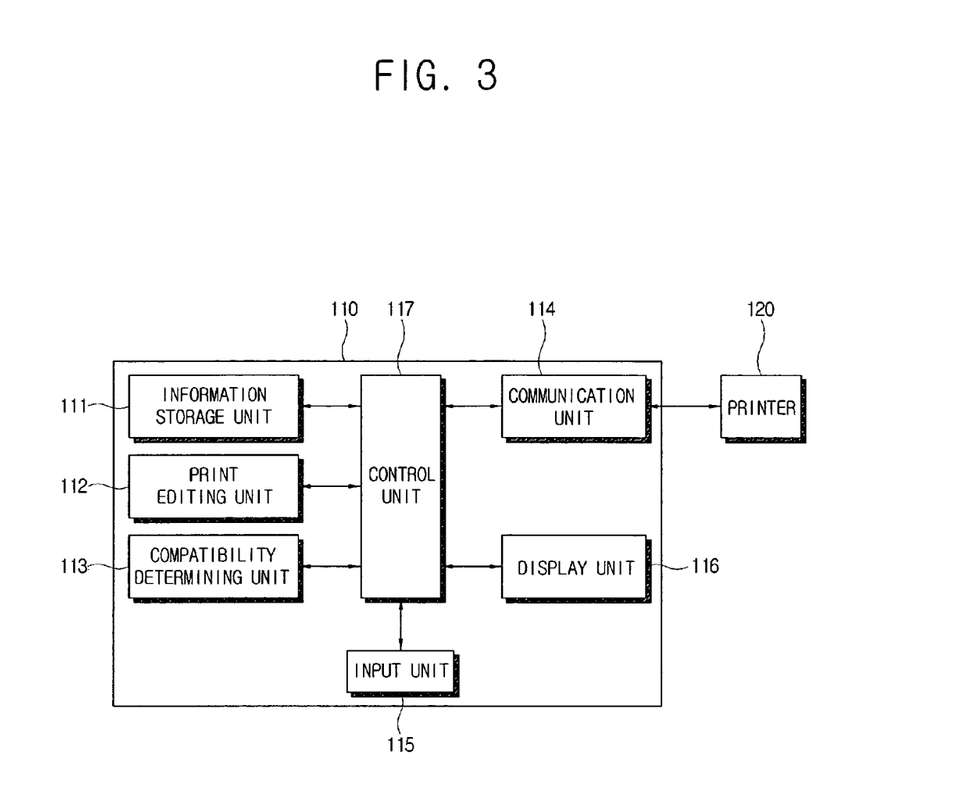
FIG. 3 is a schematic block diagram illustrating a structure of a printing system according to an exemplary embodiment of the present invention.

FIG. 3 is a schematic block diagram illustrating a printing system 100 according to an exemplary embodiment of the present invention. According to this exemplary embodiment of the present invention, the printing system 100 provides a user with an editing means for editing an object to be printed such as a photograph, a graphic, and a text among others. The printing system 100 forms an image by injecting or fixing ink, toner and the like onto a recording medium such as a paper sheet based on the printing data corresponding to the image edited by the user. In particular, the printing system 100 analyzes a property of the printing data corresponding to the image edited by the user and a printing property of the printer which performs printing operations, and estimates a printing result in advance based on the analyzed properties and informs the user of them. This prevents an inconvenience to the user and prevents resources such as ink and paper among others from being wasted as a result of re-printing.

The printing system 100 includes a print analyzing apparatus 110 and a printer 120 as shown in FIG. 3. The print analyzing apparatus 110 provides a user with an editing means for editing an object to be printed such as a photograph, a graphic, a text and the like. The print analyzing apparatus 110 analyzes the property of the printing data corresponding to the image edited by the user and the printing property of the printer 120 that performs the printing operations. The print analyzing apparatus 110 also estimates the printing results in advance based on the analyzed properties and informs the user of the printing results. The print analyzing apparatus 110 of this exemplary embodiment of the present invention may be implemented by a computer system. The printer 120 performs predetermined image processing on the printing data transmitted from the print analyzing apparatus 110 and generates the image by injecting or fixing ink, toner and the like on a recording medium such as a paper sheet based on the printing data on which the image processing is performed. The printer may be implemented by an inkjet printer, and a laser printer among others.

The print analyzing apparatus 110 includes an information storage unit 111, a print editing unit 112, a compatibility determining unit 113, a communication unit 114, an input unit 115, display unit 116, and a control unit 117. The information storage unit 111 stores the printing data of the image such as a photograph, a graphic, and a text in a prescribed format such as a file. The information storage unit 111 also stores the printing property of the printing system 100, and so on.

The print editing unit 112 enables the user to edit the printing data through any user interface by which he may select an object to be printed. The print editing unit 112 establishes a layout for the object to be printed by requiring the user to select the object to be printed. The compatibility determining unit 113 determines the printing compatibility of the printing data by comparing a data property of the printing data of the object to be printed with a printing property of the printing system 100 stored in the information storage unit 111. The communication unit 114 performs a data communication between the print analyzing apparatus 110 and the printer 120. The input unit 115 transfers various indicators and information input from the user into the control unit 117. The display unit 116 displays the printing compatibility for the printing data of the object to be printed. The compatibility is determined by the compatibility determining unit 113 under the control of the control unit 117 to facilitate viewing by the user.

If the user edits a photograph, a graphic, and a text among others to establish the layout for printing operation, the compatibility determining unit 113 analyzes the property of the object to be printed included in the layout. That is, the compatibility determining unit 113 confirms the object to be printed included in the layout, and analyzes the data property of the printing data on the confirmed object to be printed. The data property of the printing data includes a type of the printing data, such as a photograph, a text, a graphic or the like. If the printing data is a photograph, the data property of the printing data includes a compressed format, a bit-depth, a resolution, a size of image, a color space and the like. If the printing data is a text, the data property of the printing data includes a font type, a size, a bold/nonbold, an italic/nonitalic, and the like. If the type of the printing data is the graphic or the picture, the data property of the printing data includes a color, a brush/nonbrush, or a filter/nonfilter.

The compatibility determining unit 113 also analyzes the printing property of the printer 120 connected with the printing analyzing apparatus 110. The compatibility determining unit 113 can analyze the printing property of the printer 120 based on the printing property stored in the information storage unit 111. The printing property of this exemplary embodiment of the preset invention includes a printing type, such as an inkjet, laser, and thermal transfer type among others. The printing property of an exemplary embodiment of the present invention includes a DPI (dots per inch) resolution of the printer, a color space of 4 colors, 6 colors, 8 colors and the like, a type of half toning such as screening, error diffusion and the like, a supported font, and a type of printer driver to be supported such as GDI (graphics device interface), PDL (page description language), and PS (post script) among others.

The compatibility determining unit 113 compares the data property of the printing data edited by the user with the printing property of the printer 120 and analyzes the printing compatibility indicating whether it is appropriate to print the printing data using the present printer 120. For example, the compatibility determining unit 113 can determine the printing compatibility of the printing data based on the printing technology. If the object to be printed consists of only photographs or mainly consists of photographs for the image as results of analyzing the layout established by the user, the compatibility determining unit 113 determines that a color inkjet type rather than a color laser type is appropriate. If the printer 120 is a type of color laser, the compatibility determining unit 113 may recommend the use of a type of the color inkjet rather than a type of the color laser. In this case, the control unit 117 controls the display unit 116 so that it may display the printing compatibility determined and/or recommended by the compatibility determining unit 113 to facilitate viewing by a user. If the object to be printed is the photograph, the compatibility determining unit 113 can recommend that the image of good quality is output using a photo printer of thermal transfer type.

In an exemplary implementation, if the user sends instructions to print color printing data in a monotone mode, the compatibility determining unit 113 determines that there is no printing compatibility and then recommends using a color mode printer more suitable for the present printing data. Further, the compatibility determining unit 113 can recommend using a printer with a speed that is faster than the speed of the present printer 120.

In an exemplary implementation, the compatibility determining unit 113 may determine the printing compatibility in view of a resolution of the printer. More specifically, the compatibility determining unit 113 can recommend using an application software to perform the image processing in accordance with a magnification ratio. The magnification ratio is obtained by comparing the resolution of the image input with the resolution of the image output by the printer 120, since it is followed by image magnification if a picture image of low resolution is printed by the printer 120 of high resolution. The compatibility determining unit 113 determines that image quality degradation is likely to occur if the printing system 100 performs the magnification operation. Meanwhile, the compatibility determining unit 113 determines that the image quality degradation such as blurring, sharpness reduction, and the like is likely to occur if the image of high resolution is printed by the printer 120 of low resolution. That is, the resolution of the object to be printed is relatively higher than the resolution of the image to be output by the printer 120.

In an exemplary implementation, the compatibility determining unit 113 can determine the printing compatibility of the printing data based on the color space of the printer. That is, the compatibility determining unit 113 determines that more colors can be used when the image of a photograph is output. This determination is made because the more colors in ink, toner, ribbon, and such, that are used in the printing operation in the case of the color printer, makes a greater variety of colors possible for printing. If more than one color of ink or toner used in the printer 120 is all consumed, the compatibility determining unit 113 prohibits printing by informing the user of the use prior to printing. Alternatively, the compatibility determining unit 113 determines that the printer may print using ink or toner of another color. In this case, the control unit 117 displays the printing image estimated by corresponding printing data to facilitate viewing by a user through the display unit 116.

In an exemplary implementation, the compatibility determining unit 113 can determine the printing compatibility of the printing data in view of a type of half toning. For example, if the image represented by the printing data of an object to be printed is generated via scanning, a phenomenon such as moire occurs by applying a type of screening for the half toning, which results in image quality degradation. In this case, the compatibility determining unit 113 determines that a type of error diffuision rather than the type of screening is appropriate. Consequently, the compatibility determining unit 113 may recommend using an optimum type of half toning corresponding to the printer connected to it.

In an exemplary implementation, the compatibility determining unit 113 determines that there is no printing compatibility if the resolution of the printing data is not compatible with the resolution of the printer 120 connected to it. In this case, the compatibility determining unit 113 may recommend controlling a font so that it may use the font that is most suitable for resolution of the printer 120. Further, the compatibility determining unit 113 can determine whether the printer 120 can support the clean text printing for a boundary portion of the text represented by the printing data with the resolution of the printer 120.

In an exemplary implementation, the compatibility determining unit 113 recommends using the printer driver of PCL type if the printing data is complicated with large amount of data. The compatibility determining unit 113 recommends using the printer driver of GDI type if the printing data has small amount of data. Further, the compatibility determining unit 113 may recommend using a postscript type as the printer driver if the printing data includes remarkable characters. In this case, the compatibility determining unit 113 may recommend on the basis of the printing property suitable for the printing data, a related application program, information on the image quality estimated and the like, which are preferably stored in the information storage unit 111.

Figure 4:
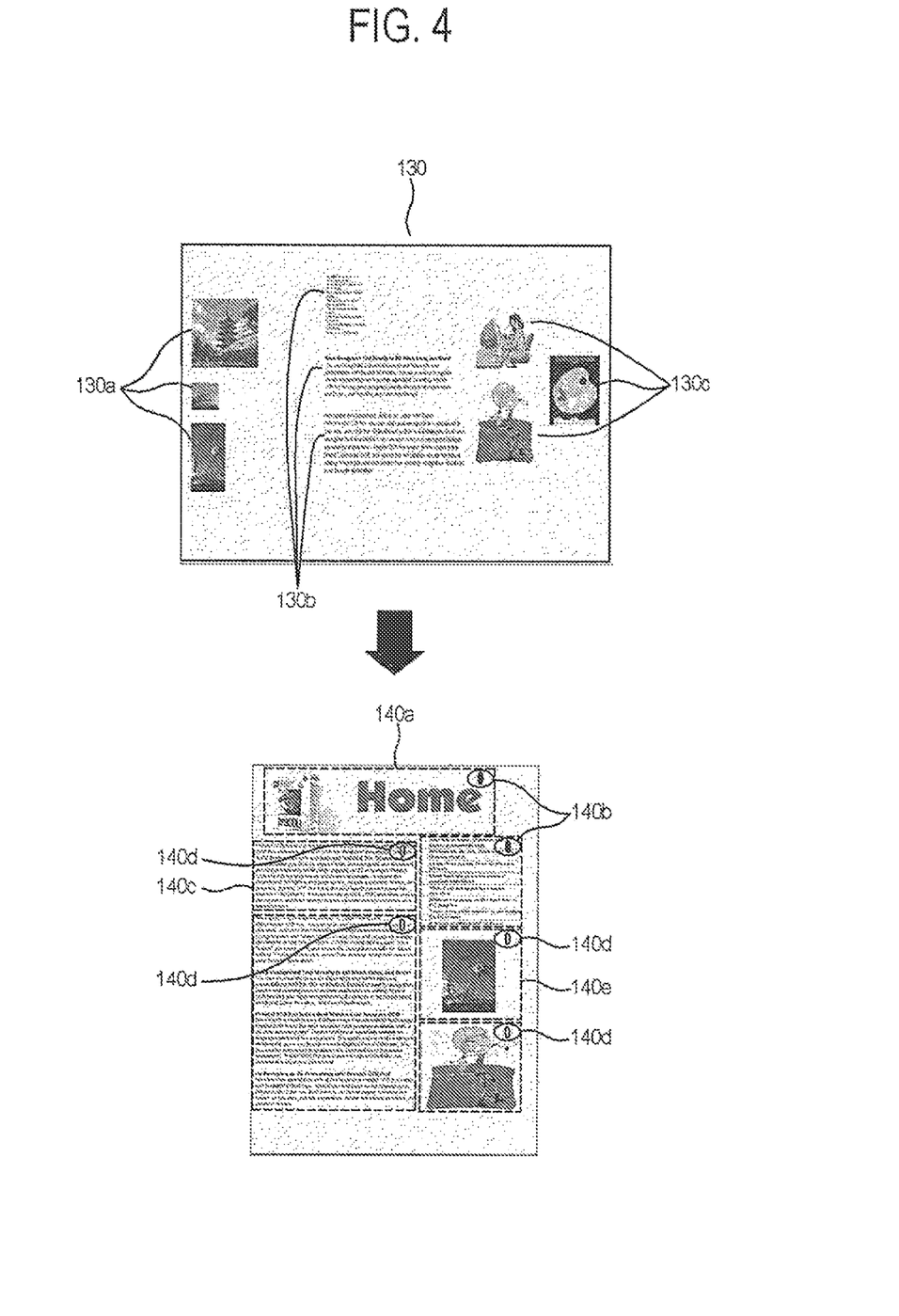
FIG. 4 is a diagram illustrating an example of an image printed by the printing system of the exemplary embodiment of the present invention.

FIG. 4 illustrates an example of an image printed by the printing system 100 of this exemplary embodiment of the present invention. The print editing unit 112 causes the display unit 116 to display the image 130 including a photograph 130a, a text 130b, and a picture, a drawing or a graphic 130c. The print editing unit 120 establishes the layout 140 based on the image 140a, 140c and 140e selectively edited by the user among the photograph 130a, the text 130b, and the picture or the graphic 130c. The control unit 117 causes the display unit to display indicators 140b and 140d indicating the printing compatibility of the printing data in a duplicated state with the image 130 of the layout 140 based on the determination by the compatibility determining unit 113. According to this exemplary embodiment of the present invention, the indicator 140b indicates that the estimated printing image is of a good quality, and the indicator 140d indicates that the estimated printing image is of a poor quality. That is, if it is determined that the image 140a included in the layout 140 is of a good quality as a result of determination by the compatibility determining unit 113, the control unit 117 controls the display unit 116 to display the indicator 140b in a duplicated state with a portion of the image 140a. Meanwhile, if the image 140c of the text included in the layout 140 is not supported for font, the control unit 117 controls the display unit 116 to display the indicator 140d indicating the image is of a poor quality.

Figure 5:
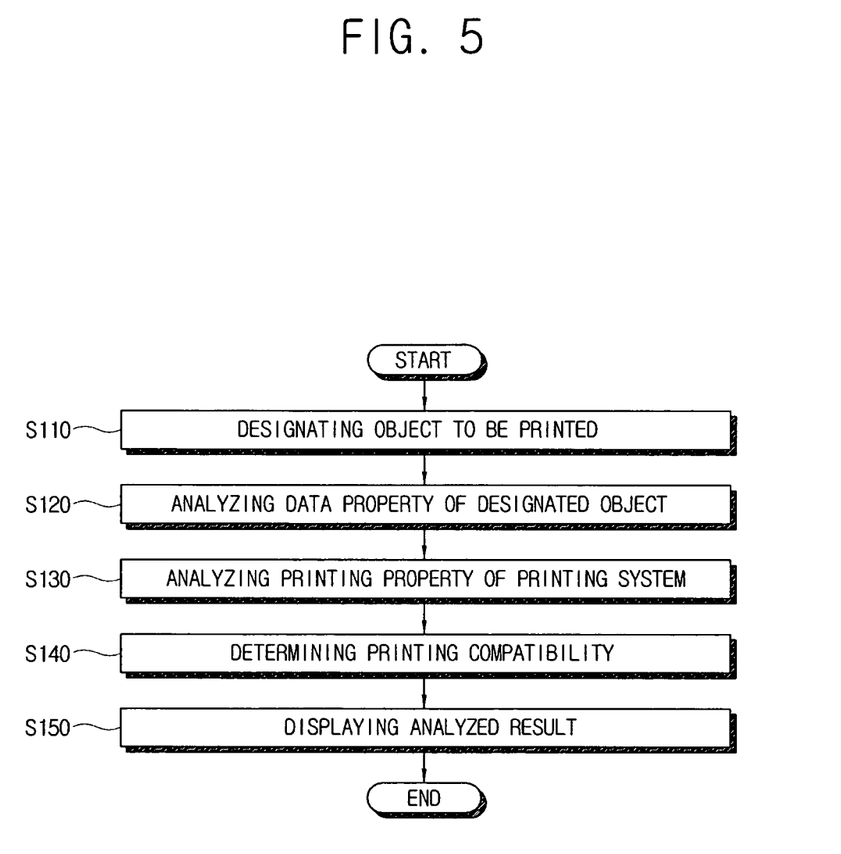
FIG. 5 is a flow chart illustrating operations of the printing system of the exemplary embodiment of the present invention.

FIG. 5 is a flow chart illustrating operations of the printing system 100 according to this exemplary embodiment of the present invention. The printing system 100 causes the user to designate an object to be printed through a predetermined user interface (S110). The printing system 100 analyzes the data property of the printing data corresponding to the designated object (S120). The printing system 100 then compares the data property of the printing data analyzed with the printing property of the printing system 100 stored in advance (S130) and determines the printing compatibility of the printing data (S140). The printing system 100 displays the printing compatibility of the printing data determined to facilitate viewing by the user, and recommends the printing property suitable for the printing data if necessary (S150).

As described above, an exemplary embodiment of the present invention provides a printing system and a printing method capable of preventing an inconvenience to a user and preventing resources from being wasted as a result of re-printing.

While the present invention has been shown and described with reference to certain exemplary embodiments thereof, it will be understood by those skilled in the art that various changes in form and details may be made without departing from the spirit and scope of the invention as defined by the appended claims and their equivalents.

What is claimed is:

1. A printing method comprising:
   storing a printing property of a printing system;
   determining by a compatibility determining unit, a printing compatibility of a printing data of an object included in a file to be printed by comparing a data property of the printing data with the stored printing property of the printing system, wherein the object is one of a plurality of objects included in the file;
   displaying a printing image estimated from the printing data based on the stored printing property;
   determining a quality information for the object in the printing image based on the determined printing compatibility; and
   displaying on a display unit, an indicator of the quality information for the object together with the object in the displayed printing image;
   wherein the object included in the file to be printed comprises one of a photograph, graphic and text; and
   wherein the display unit displays the indicator of the determined quality information for the object in a duplicated state with a portion of the corresponding estimated printing image.

2. The printing method according to claim 1, further comprising:
   storing in an information storage unit, a suitable printing property of the printing system corresponding to the data property of the printing data; and
   displaying the suitable printing property if the printing data of the object to be printed is not suitable based on the determined printing compatibility.

3. The printing method according to claim 2, further comprising displaying a printing image estimated from the printing data based on the suitable printing property.

4. The printing method according to claim 1, further comprising:
   storing an application program information corresponding to the data property and the printing property of the printing data; and
   displaying the stored application program information corresponding to the printing data of the object to be printed.

5. The printing method according to claim 1, wherein the data property of the printing data comprises at least one of a type of the printing data, an amount of the printing data, whether the printing data is generated via scanning, and at least one of a resolution, a size, a color, and a font of image corresponding to the printing data.

6. The printing method according to claim 1, wherein the printing property of the printing system comprises at least one of a printing type, a printing speed, a resolution, a color, a type of half toning, and printer driver information.

7. The printing method according to claim 2, wherein the suitable printing property indicates that a color inkjet type or a thermal transfer type is appropriate if the object to be printed is a photograph.

8. The printing method according to claim 2, wherein the suitable printing property indicates that there is no printing compatibility if the user sends instructions to print color printing data in a monotone mode.

9. The printing method according to claim 2, wherein the displaying the suitable printing property comprises recommending that an application software to perform an image processing in accordance with a magnification ratio should be used, if a picture image of low resolution is printed by a printing system of high resolution.

10. The printing method according to claim 1, wherein the determining a printing compatibility comprises determining that image quality degradation is likely to occur if the printing system performs a magnification operation.

11. The printing method according to claim 1, wherein the determining a printing compatibility comprises determining that at least one of blurring, sharpness reduction, and the like is likely to occur if an image of high resolution is printed by a printing system of low resolution.

12. The printing method according to claim 1, further comprising informing the user of the use status of ink or toner used in the printing system prior to printing if more than one color of the ink or toner is all consumed.

13. The printing method according to claim 1, further comprising informing the user that the printing system may print using ink or toner of another color, if more than one color of ink or toner used in the printing system is all consumed.

14. The printing method according to claim 2, wherein the suitable printing property indicates that a type of error diffusion rather than the type of screening is appropriate if an image represented by the printing data of an object to be printed is generated via scanning.

15. The printing method according to claim 1, wherein the determining a printing compatibility comprises determining that there is no printing compatibility if the resolution of the printing data is not compatible with the resolution of the printing system.

16. The printing method according to claim 2, wherein the suitable printing property indicates a font which may be most suitable for a resolution of the printing system.

17. The printing method according to claim 2, wherein the suitable printing property indicates that a printer driver of PCL type or a printer driver of GDI type should be used based on an amount of the printing data.

18. The printing method according to claim 2, wherein the suitable printing property indicates that a printer driver of postscript type should be used based on a type of characters included in the printing data, if the printing data includes characters.

19. A printing system comprising:
a display unit;
an information storage unit for storing a printing property of a printing system;
a compatibility determining unit for determining a printing compatibility of printing data of at least one object, of a plurality of objects included in a file to be printed, by comparing a data property of the printing data of the object with the stored printing property of the printing system and determining a quality information for the at least one object based on the determined printing compatibility; and
a control unit for controlling the display unit to display a printing image estimated from the printing data of the object based on the stored printing property and an indicator of the determined quality information for the at least one object together with the object in the displayed printing image;
wherein the plurality of objects included in the file to be printed comprise a photograph, graphic and text; and
wherein the control unit controls the display unit to display the indicator of the determined quality information in a duplicated state with a portion of the corresponding estimated printing image.

20. The printing system according to claim 19, wherein the information storage unit further stores a suitable printing property of the printing system corresponding to the data property of the printing data, and the control unit controls the display unit to display the suitable printing property if the printing data of the object to be printed is not suitable based on the determined printing compatibility.

21. The printing system according to claim 20, wherein the control unit controls the display unit to display a printing image estimated from the printing data based on the suitable printing property.

22. The printing system according to claim 19, wherein:
the information storage unit further stores an application program information corresponding to the data property and the printing property; and
the control unit controls the display unit to display the application program information stored corresponding to the printing data of the object to be printed.

23. The printing system according to claim 19, wherein the data property of the printing data comprises at least one of a type of the printing data, an amount of the printing data, whether the printing data is generated via scanning, and at least one of a resolution, a size, a color, and a font of image corresponding to the printing data.

24. The printing system according to claim 19, wherein the printing property of the printing system comprises at least one of a printing type, a printing speed, a resolution, a color, a type of half toning, and printer driver information.

25. The printing system according to claim 20, wherein the suitable printing property indicates that a color inkjet type or a thermal transfer type is appropriate if the object to be printed is a photograph.

26. The printing system according to claim 20, wherein the suitable printing property indicates that there is no printing compatibility, if the user sends instructions to print color printing data in a monotone mode.

27. The printing system according to claim 20, wherein the suitable printing property recommends that an application software to perform an image processing in accordance with a magnification ratio should be used, if a picture image of low resolution is printed by a printing system of high resolution.

28. The printing system according to claim 19, wherein the compatibility determining unit determines that image quality degradation is likely to occur if the printing system performs a magnification operation.

29. The printing system according to claim 19, wherein the compatibility determining unit determines that at least one of blurring, sharpness reduction, and the like is likely to occur if an image of high resolution is printed by a printing system of low resolution.

30. The printing system according to claim 19, wherein the compatibility determining unit informs the user of the use status of ink or toner used in the printing system prior to printing if more than one color of the ink or toner is all consumed.

31. The printing system according to claim 19, wherein the compatibility determining unit informs the user that the printing system may print using ink or toner of another color, if more than one color of ink or toner used in the printing system is all consumed.

32. The printing system according to claim 20, wherein the suitable printing property indicates that a type of error diffusion rather than a type of screening is appropriate if an image represented by the printing data of an object to be printed is generated via scanning.

33. The printing system according to claim 19, wherein the compatibility determining unit determines that there is no printing compatibility if a resolution of the printing data is not compatible with a resolution of the printing system.

34. The printing system according to claim 20, wherein the suitable printing property indicates a font which may be most suitable for the resolution of the printing system.

35. The printing system according to claim 20, wherein the suitable printing property indicates that a printer driver of PCL type or a printer driver of GDI type should be used based on an amount of the printing data.

36. The printing system according to claim 20, wherein the suitable printing property indicates that a printer driver of postscript type should be used based on a type of characters included in the printing data, if the printing data includes characters.

37. A printing system comprising:
a print analyzing apparatus for providing a user with an editing means for editing an object included in a file to be printed; and a printer for performing image processing on printing data transmitted from the print analyzing apparatus;

wherein the print analyzing apparatus analyzes a property of the printing data corresponding to the object edited by the user and a printing property of the printer that performs printing operations, estimates a printing result in advance before printing based on the analyzed properties, determines a quality information for the object based on the estimated printing result, and informs the user of the estimated printing result with an indicator of the quality information for the object in the estimated printing result; and wherein the object included in the file to be printed comprises one of a photograph, graphic and text; and wherein the print analyzing apparatus displays the indicator of the determined quality information for the object in a duplicated state with a portion of the corresponding estimated printing result.

38. The printing system according to claim 37, wherein the print analyzing apparatus further comprises:
    a print editing unit for editing printing data through a user interface by which a user may select an object to be printed;
    a communication unit for performing a data communication between the print analyzing apparatus and the printer; and
    an input unit for transferring information input from the user into a control unit.

39. The printing system according to claim 38, wherein the print editing unit establishes a layout for the object to be printed by requiring a user to select the object.

40. The printing system according to claim 37, wherein the printer generates an image by at least one of injecting and fixing at least one of ink and toner on a recording medium based on the printing data on which the image processing is performed.

* * * * *